United States Patent
Snapp

(10) Patent No.: US 8,712,964 B2
(45) Date of Patent: Apr. 29, 2014

(54) SYSTEMS AND METHODS FOR UPDATING A DATA STORE USING A TRANSACTION STORE

(75) Inventor: Robert F. Snapp, Carrollton, GA (US)

(73) Assignee: United States Postal Services, Washington, DC (US)

(*) Notice: Subject to any disclaimer, the term of this patent is extended or adjusted under 35 U.S.C. 154(b) by 818 days.

(21) Appl. No.: 12/326,796

(22) Filed: Dec. 2, 2008

(65) Prior Publication Data

US 2010/0138389 A1 Jun. 3, 2010

(51) Int. Cl.
*G06F 17/30* (2006.01)

(52) U.S. Cl.
USPC .......................................... 707/638

(58) Field of Classification Search
USPC .......................................... 707/638
See application file for complete search history.

(56) References Cited

U.S. PATENT DOCUMENTS

| | | | |
|---|---|---|---|
| 2006/0020807 A1* | 1/2006 | Aura et al. | 713/176 |
| 2006/0059207 A1* | 3/2006 | Hirsch et al. | 707/201 |
| 2006/0123250 A1* | 6/2006 | Maheshwari et al. | 713/193 |
| 2008/0027980 A1 | 1/2008 | Owens et al. | |
| 2008/0141365 A1 | 6/2008 | Soegtrop | |
| 2008/0270436 A1 | 10/2008 | Fineberg et al. | |
| 2008/0294674 A1 | 11/2008 | Reztlaff, II et al. | |
| 2009/0070196 A1* | 3/2009 | Shaffer et al. | 705/10 |

OTHER PUBLICATIONS

International Search Report dated Feb. 19, 2009, for International Application No. PCT/US08/87806, filed Dec. 19, 2008.

* cited by examiner

*Primary Examiner* — Hosain Alam
*Assistant Examiner* — Johnese Johnson
(74) *Attorney, Agent, or Firm* — Knobbe Martens Olson & Bear LLP

(57) ABSTRACT

Embodiments include systems and methods for updating a data store in a distributed data store system. In one embodiment, a previous version of a data store is compared to an updated version of the data store in order to create a transaction store. The transaction store may include a cryptographic hash indicative of the previous version of the data store and a cryptographic hash indicative of the updated version of the data store. The transaction store further indicates data differences between the previous and updated versions of the data stores. The transaction store may then be used to update data stores at other locations.

19 Claims, 12 Drawing Sheets

```
          ↙ 102A                                                                                   ↙ 502
00000000  64 a6 46 46 01 2a 3a 92 04 09 11 44 04 04 26 76 01    d..FF.*:....D..&v.
00000010  0a 26 91 22 40 2a 61 a2 80 92 7f 00 01 94 8a 14    .&."@*a.........
00000020  06 83 04 32 e0 47 10 72 14 04 16 a0 00 b5 14 0c    ...2.G.r........
00000030  10 b1 20 08 a0 00 f2 08 90 11 00 00 9b 81 e9 a9    .. .............
00000040  f6 b1 02 cb 48 c8 e1 34 89 00 a8 00 43 35 00 28    ....H..4....C5.(
00000050  45 05 47 47 d0 f4 14 01 82 d4 10 0a 22 27 84       E.GG........"'.
00000060  84 e0 04 22 82 20 12 b4 23 a6 70 09 80 14 90       ..."..  ..#.p....
00000070  14 89 00 15 3e 62 41 58 08 50 a5 13 80 37 a1 48    ....>bAX.P...7.H
00000080  47 10 7e ac 84 00 31 8c 87 51 60 10 b0 52 19 b3    G.~...1..Q`..R..
00000090  40 94 80 42 03 82 21 42 02 0b f0 68 86 12 47       @..B..!B...h..R
000000a0  01 0d 40 29 30 06 2d 4a 88 50 89 01 48 44 22 d0    ..@)0.-J.P..HD".
000000b0  90 b2 90 3b 20 81 19 1e 24 80 20 66 a8 c6 80 2f    ...; ...$. f.../
```

SYSTEMS AND METHODS FOR UPDATING A DATA STORE USING A TRANSACTION STORE

BACKGROUND OF THE INVENTION

1. Field of the Invention

The developed embodiments relate to systems and methods for updating distributed data stores.

2. Description of the Related Art

Distributed data stores allow data to be stored in multiple locations. When data is updated at one location, there is a need to incorporate those updates into the data stores at other locations as well. Hence, improved methods and systems for updating a distributed data store are desirable.

SUMMARY OF CERTAIN INVENTIVE ASPECTS

The systems, methods, and devices of the development each have several aspects, no single one of which is solely responsible for its desirable attributes. Without limiting the scope of the development as expressed by the claims which follow, its more prominent features will now be discussed briefly. After considering this discussion, and particularly after reading the section entitled "Detailed Description of Certain Embodiments" one will understand how the features of the development provide advantages that include greater security and efficiency for updating data stores.

One aspect of the current development is to create a secure and efficient method of updating a distributive data store. In one embodiment, a method of creating a transaction store for updating a data store comprises receiving a first version of a binary data store, receiving a second version of a binary data store, outputting to a transaction store on a computer readable medium a cryptographic hash indicative of the first version of the binary data store, outputting to the transaction store a cryptographic hash indicative of the second version of the binary data store, determining a portion of the data in the second version of the binary data store that is the same as the data in the first version of the binary data store, and outputting to the transaction store an indicator representative of the length of the portion of the data that is the same in both the first version of the binary data store and the second version of the binary data store.

In another embodiment, a method of updating a binary data store based on a transaction store comprises receiving a binary data store, receiving a transaction store from a computer readable memory for describing differences between a first and a second version of a binary data store, wherein the transaction store comprises a first cryptographic hash, a second cryptographic hash, and an indicator representative of a portion of the data in the binary data store that is to remain unchanged, determining whether a cryptographic hash indicative of the binary data store is the same as the first cryptographic hash, updating the binary data store by changing the value of the bit in a position associated with the portion of data in the binary data store that is to remain unchanged, and determining whether the second cryptographic hash is the same as a cryptographic hash indicative of the updated binary data store.

In another embodiment, a method of updating a data store based on a transaction store comprises receiving a binary data store, receiving a transaction store from a computer readable medium for describing differences between a first and a second version of a binary data store, wherein the transaction store comprises a first cryptographic hash, a second cryptographic hash, and an indicator representative of a portion of the data in the binary data store that is to remain unchanged, data that is to be updated in the binary data store, determining whether a cryptographic hash indicative of the binary data store is the same as the first cryptographic hash, updating the binary data store by inserting the data that is to be updated in the binary data store in a position associated with the portion of data in the binary data store that is to remain unchanged, and determining whether the second cryptographic hash is the same as a cryptographic hash indicative of the updated binary data store.

In another embodiment, a system for creating a transaction store for updating a binary data store comprises a storage medium configured to store a first version of a binary data store and a second version of the binary data store, and at least one processor configured to output to a transaction store a cryptographic hash indicative of the first version of the binary data store, output to the transaction store a cryptographic hash indicative of the second version of the binary data store, determine a portion of data in the second version of the binary data store that is the same as the data in the first version of the binary data store, and output to the transaction store an indicator representative of the length of the portion of data that is the same in both the first version of the binary data store and the second version of the binary data store.

In another embodiment, a system for updating a data store based on a transaction store comprises a storage medium configured to store a binary data store and a transaction store, and at least one processor configured to receive a first cryptographic hash from the transaction store, receive a second cryptographic hash from the transaction store, determine whether a cryptographic hash indicative of the first version of the binary data store is the same as the received first cryptographic hash, receive at least one indicator from the transaction store representative of a portion of data in the binary data store that is to remain unchanged, update the binary data store based on the received indicator, and determine whether the second cryptographic hash is the same as a cryptographic hash indicative of the updated binary data store.

In another embodiment, a system for updating a binary data store based on a transaction store comprises a storage medium configured to store a binary data store and a transaction store, and at least one processor configured to receive a first cryptographic hash from the transaction store receive a second cryptographic hash from the transaction store determine whether a cryptographic hash indicative of the binary data store is the same as the received first cryptographic hash, receive an indicator from the transaction store representative of a portion of data in the binary data store that is to remain unchanged, receive from the transaction store data that is to be updated in the binary data store, update the binary data store by inserting the data that is to be updated in binary data store in a position associated with the portion of data in the binary data store that is to remain unchanged, and determine whether the second cryptographic hash is the same as a cryptographic hash indicative of the updated binary data store.

In another embodiment, a system for creating a transaction store for updating a binary data store comprises means for storing a first version of a binary data store and a second version of a binary data store, and means for processing data, said processing means configured to output to a transaction store a cryptographic hash indicative of the first version of the binary data store, output to the transaction store a cryptographic hash indicative of the second version of the binary data store, determine a portion of data in the second version of the binary data store that is the same as the data in the first version of the binary data store, and output to the transaction store an indicator representative of the length of the portion of data that is the same in both the first version of the binary data store and the second version of the binary data store.

In another embodiment, a system for updating a data store based on a transaction store comprises means for storing a binary data store and a transaction store, and means for processing data, said processing means configured to receive a first cryptographic hash from the transaction store, receive a second cryptographic hash from the transaction store, determine whether a cryptographic hash indicative of the binary data store is the same as the received first cryptographic hash, receive an indicator from the transaction store representative of a portion of data that is to remain unchanged in the binary data store, update the binary data store based on the received indicator, and determine whether the received second cryptographic hash is the same as a cryptographic hash indicative of the updated binary data store.

In another embodiment, a system for updating a data store based on a transaction store comprises means for storing a binary data store and a transaction store, and means for processing data, said processing means configured to receive a first cryptographic hash from the transaction store, receive a second cryptographic hash from the transaction store, determine whether a cryptographic hash indicative of the binary data store is the same as the received first cryptographic hash, receive an indicator from the transaction store representative of a portion of data that is to remain unchanged in the binary data store, receive from the transaction store data that is to be updated in the first version of the binary data store, update the binary data store by inserting the data that is to be updated in the binary data store in a position associated with the portion that is to remain unchanged in the binary data store, and determine whether the received second cryptographic hash is the same as a cryptographic hash indicative of the updated binary data store.

BRIEF DESCRIPTION OF THE DRAWINGS

FIG. 5 is a data diagram illustrating one embodiment of a version of a data store.

FIG. 7 is a data diagram illustrating one embodiment of an updated version of a data store.

FIG. 10 is a data diagram illustrating one embodiment of a version of a data store.

FIG. 11 is a data diagram illustrating one embodiment of a transaction store.

DETAILED DESCRIPTION OF CERTAIN EMBODIMENTS

The following detailed description is directed to certain specific embodiments of the development. However, the development can be embodied in a multitude of different ways as defined and covered by the claims. In this description, reference is made to the drawings wherein like parts are designated with like numerals throughout.

Distributed data stores allow a particular set of data to be stored in multiple locations. When data is updated on one data store, it often also is desirable to update it on other data stores located elsewhere. For example, in the case of a central data center that provides data to subscribing customers, the central data center may first provide a subscriber with an initial set of data. Then, when the central data center updates its data, it may provide subscribers with incremental updates as well. Examples of such data systems include the United States Postal Service's ("USPS") data stores, such as LACS$^{Link}$®, Suite$^{Link}$®, NCOA$^{Link}$®, ANK$^{Link}$®, DPV®, DSF2®, RDI™, and APT$^{Link}$. The data stores include information such as address information.

Embodiments include systems and methods for updating such a data store. In one embodiment, a previous version of a data store is compared to an updated version of the data store in order to create a transaction store. In one embodiment, a transaction store refers to data used to update a data store. In one embodiment, the transaction store is a file. The transaction store includes a cryptographic hash indicative of the previous version of the data store and a cryptographic hash indicative of the updated version of the data store. The transaction store further indicates data differences between the previous and updated versions of the data stores on the bit or byte level. The transaction store may then be used to update data stores at other locations.

Updating a data store based on such a transaction store that indicates differences between the two data stores at the bit or byte level can provide important benefits. For example, it allows for electronic update of large master files without indicating the number of records changed or revealing any of the updated data. The data remains secure because even if the transaction store is intercepted, it is meaningless except in conjunction with the original version of the data store. In one embodiment, the transaction store provides a smaller file for distribution and allows a more rapid update than full file or record replacement. For example, the transaction store was typically less than 1% of the original data store size in a system according to one embodiment, and in a system according to another embodiment, the transaction store was only 0.1% the size of the original data store.

Figure 1:
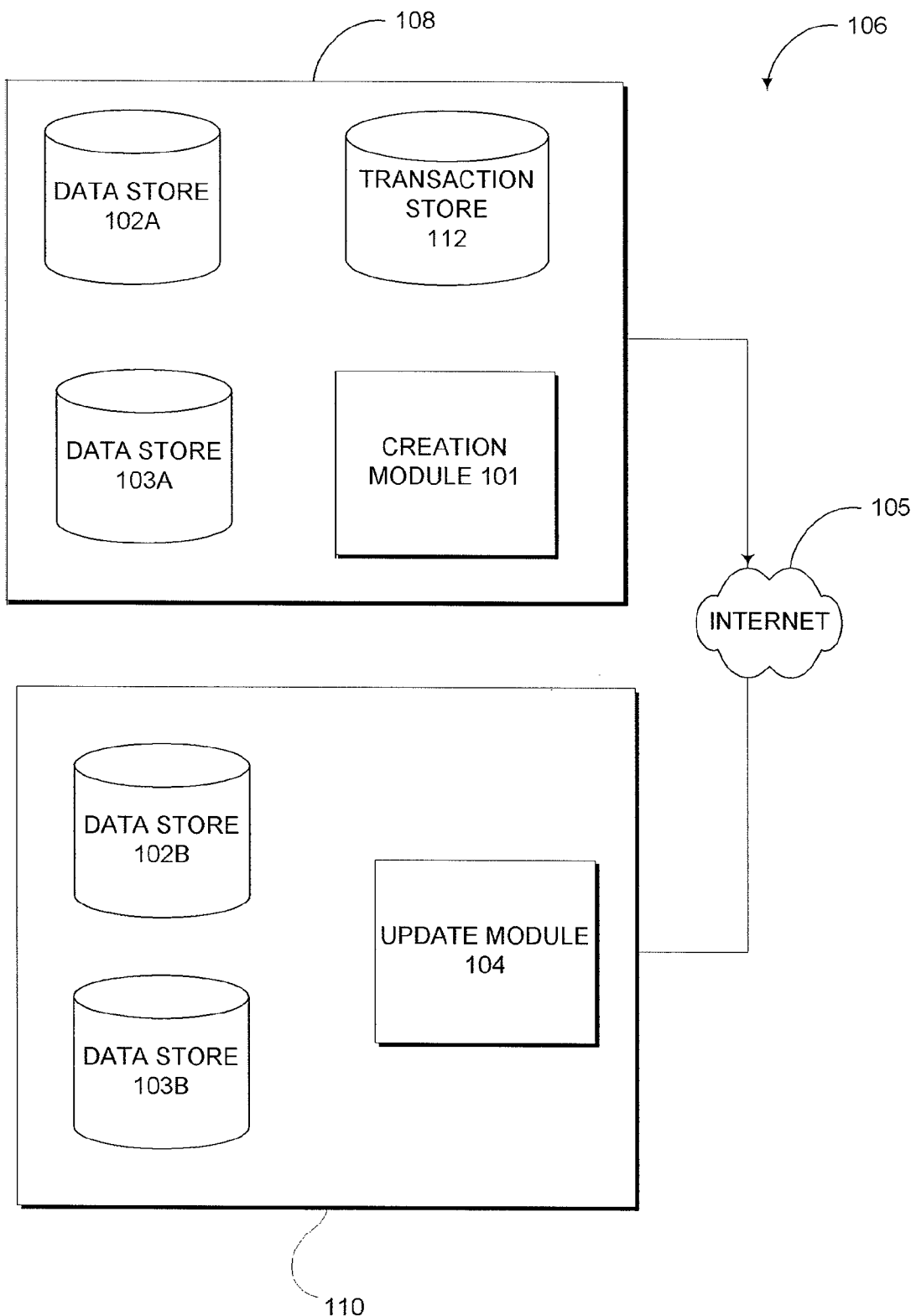
FIG. 1 is a block diagram illustrating one embodiment of a distributed data store system.

FIG. 1 is a block diagram illustrating a distributed data store system 106. The distributed data store system 106 includes a master data store server 108 and a distributed data store server 110. The master data store server 108 includes a creation module 101, a master copy of a first version of a data store, e.g., an initial master data store 102A, a master copy of a second version of the data store, e.g., an updated master data store 103A, and a transaction store, e.g. a transaction store 112, for indicating differences between an initial data store 102A and a second version of a data store 103A. The distributed data store server 110 includes an update module 104 and a distributed copy of first version of the data store, e.g., an initial distributed data store 102B. The distributed data store server 110 is also configured to store a duplicate copy of the second version of the data store, e.g., a distributed updated data store 103B.

The data store servers 108 and 110 may be configured to communicate via a network 105. In one embodiment, the network 105 includes the Internet. In other embodiments, the data store servers 108 and 110 may be configured to communicate by any suitable mechanism, including via distribution of physical computer readable media, such as tapes or disks.

In one embodiment, the initial master data store 102A, located on the master data store server 108, is an initial or first (which may have been previously updated) version of a particular data store, and it is identical to the initial distributed data store 102B, which is located on the distributed data store server 110. The updated master data store 103A is an updated version of the initial master data store 102A that incorporates changes associated with one or more transactions or other changes to the data store. The data store server 108 includes a creation module 101 that compares the data stores 102A and 103A in order to create a transaction store indicative of the differences between the initial version 102A and the updated version 103A of the data store. The data store server 108 provides a transaction store 112, for example, over the network 105, to the data store server 110.

The data store server 110 contains the update module 104, which uses the received transaction store 112 to update the initial distributed data store 102B. The data store 103B is updated by update module 104 such that it is an updated version of the data store 102B. Using the transaction store 112 for updating ensures that the distributed updated data store 103B is then substantially identical to the updated data store 103A. Thus, each individual distributed data store is updated to contain substantially the same data. One skilled in the art will recognize that the data stores discussed herein may be in any suitable format. In one embodiment, the data stores 102A, 102B, 103A, and 103B are files containing one or more records storing specified data or data elements. In another embodiment, the data stores 102A, 102B, 103A, and 103B are flat files, e.g., a file comprising data and delimiters, which may be structured in rows and/or columns. In other embodiments, the data stores 102A, 102B, 103A, and 103B may comprise any suitable data format. In one embodiment, portions of the data stores 102A, 102B, 103A, and 103B comprise cryptographic hashes indicative of all or a portion of a particular data record. One such database is described in U.S. Pat. No. 7,159,119, which is hereby incorporated herein by reference in its entirety. For example, U.S. Pat. No. 7,159,119 discloses, "Once a standardized version of the type-independent portion of the access information has been produced by standardization module 20, the standardized information (e.g., an EDMP) is hashed using a Secure Hash Algorithm (SHA) by SHA generator 21A." Specification, col. 4, lines 6-12.

Figure 2:
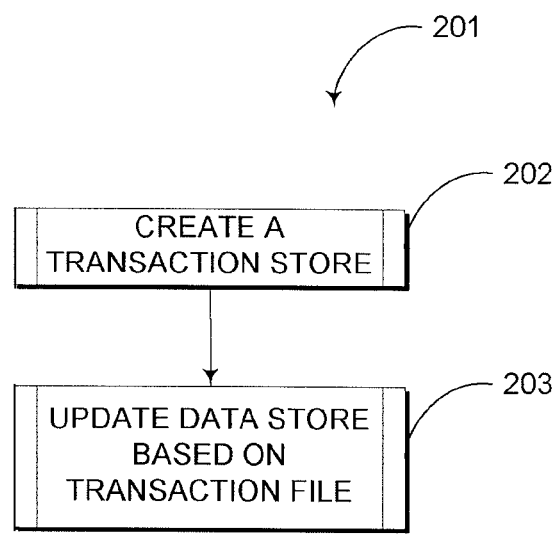
FIG. 2 is a flowchart illustrating one embodiment of a method for updating a data store.

FIG. 2 is a flowchart illustrating a process 201 of updating the data store 102B so that it is identical to the data store 103A. Beginning at a block 202, the creation module 101 creates the transaction store 112 indicative of the differences between the initial version 102A and the updated version 103A of the data store. The creation module 101 then sends the transaction store 112 to the update module 104. In one embodiment, the transaction store 112 is sent via the Internet 105. Moving to a block 203, the update module 104 updates the data store 102B based on the received transaction store 112. The resulting updated data store 103B contains data substantially identically to the data in data store 102B.

Each step is discussed separately below. It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Figure 3:
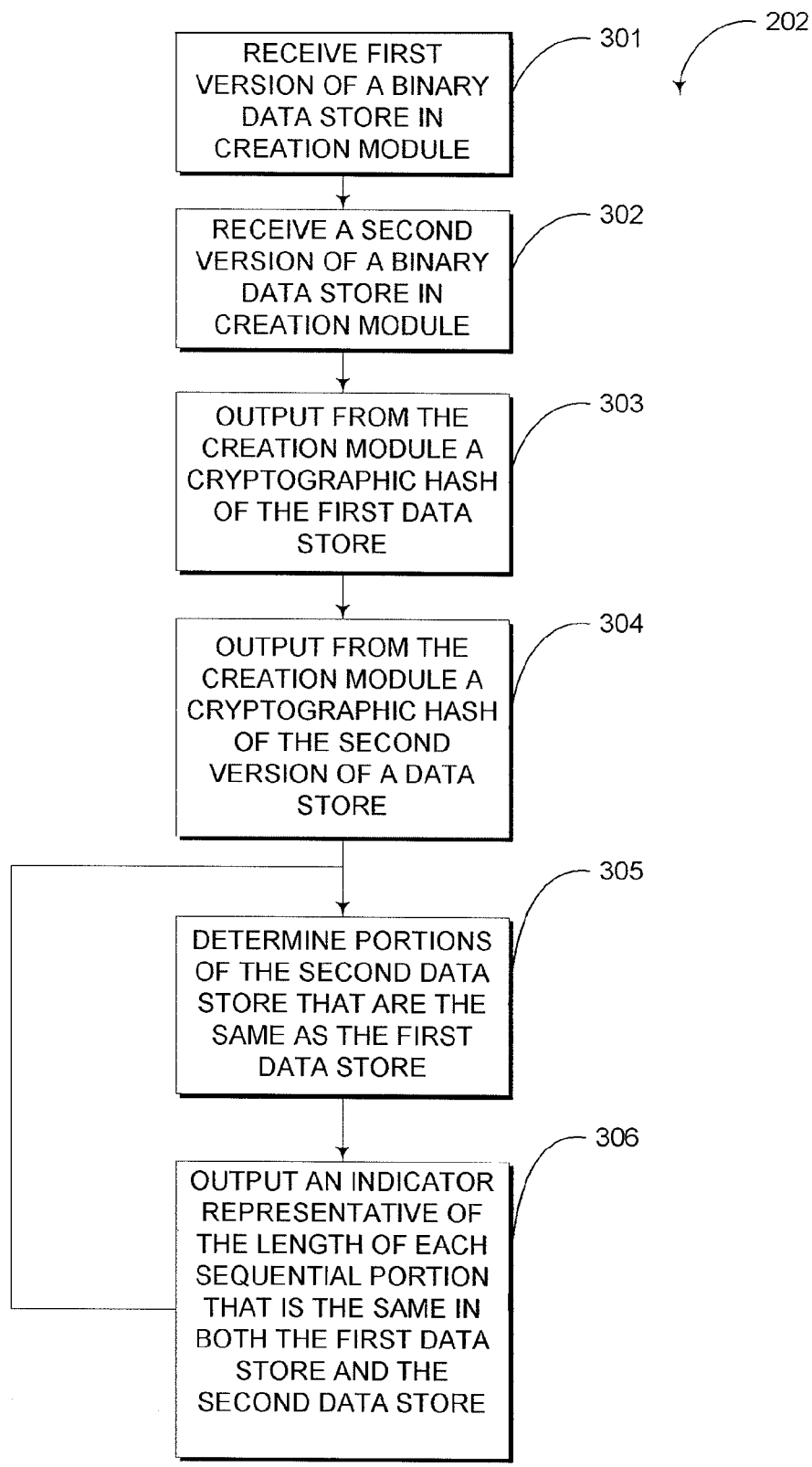
FIG. 3 is a flowchart illustrating one embodiment of a method for creating a transaction store for updating a data store.

FIG. 3 is a flowchart illustrating one embodiment of the sub-process 202 of FIG. 2 for creating the transaction store 112. In one embodiment, the transaction store 112 indicates the differences between the data store 102A and the data store 103A at the bit level. The sub-process 202 may be used on data stores having fixed size records. For example, the sub-process 202 for using a transaction store that indicates differences in data stores at the bit level may be used in applications such as the DPV® DSF2® data stores provided by the USPS.

Beginning at a block, 301, the creation module 101 receives from the transaction store 112 a first version of a binary data store, the data store 102A. At a block 302, the creation module 101 receives from the transaction store 112 a second version of a binary data store, corresponding to the data store 103A. The creation module 101 produces a cryptographic hash indicative of the initial master data store 102A and outputs it to the transaction store 112 at a block 303. In one embodiment, a cryptographic hash is any type of cryptographic hash, for example, a SHA-1.

Proceeding to a block 304, the creation module 101 produces a cryptographic hash indicative of the updated data store 103A and outputs it to the transaction store 112. It is to be appreciated that the cryptographic hash values indicative of the data store 102A and the data store 103A may be located at any position within the transaction store 112. In one embodiment, the cryptographic hash indicative of the initial data store 102A is the first 20 bytes of the transaction store 112, and the cryptographic hash indicative of updated data store 103A is the second 20 bytes of the transaction store 112.

Proceeding to a block 305, the creation module 101 compares the data in the data store 102A to the data in the data store 103A and determines the sequential portions of the updated data store 103A that are the same as the original data store 102A. In one embodiment, the creation module 101 compares each bit in the data store 102A to each bit in the data store 103A and adds one to a counter each time a bit in the data store 102A is the same as the bit in the data store 103A. In another embodiment, the creation module 101 compares the bytes of the data store 102A to the bytes in the data store 103A and adds 8 to a counter each time it encounters another byte that is identical.

Next at a block 306, the creation module 101 identifies a bit subsequent to each identical sequential portion of the data stores 102A and 103A that is different between the two versions of the data store 102A and 103A. The creation module 101 outputs an indicator, such as number, representative of the length of a sequential portion that is the same in both the original data store 102A and the updated data store 103A. In one embodiment, a 16 bit or two byte number is used to indicate the length of a sequential portion that is the same in the original data store 102A and the updated data store 103A. Differences in this embodiment are indicated by implication: for example, the bit following the sequential portion is implied to be inverted. Thus, for each identical sequential portion, when the creation module 101 encounters data that is different in the updated data store 103A than in the initial data store 102A, the creation module 101 outputs the current count (which depending on the embodiment may be a count of bits or a count of bytes) of identical data to the transaction store 112 and starts the counter back at zero. The creation module 101 continues to compare the rest of the data in the data store 102A to the data in the data store 103A using the same process described above. One skilled in the art would recognize that the data can be compared in any appropriate increment, and the system and methods are not limited to recording differences in increments of bytes or bits.

Figure 4:
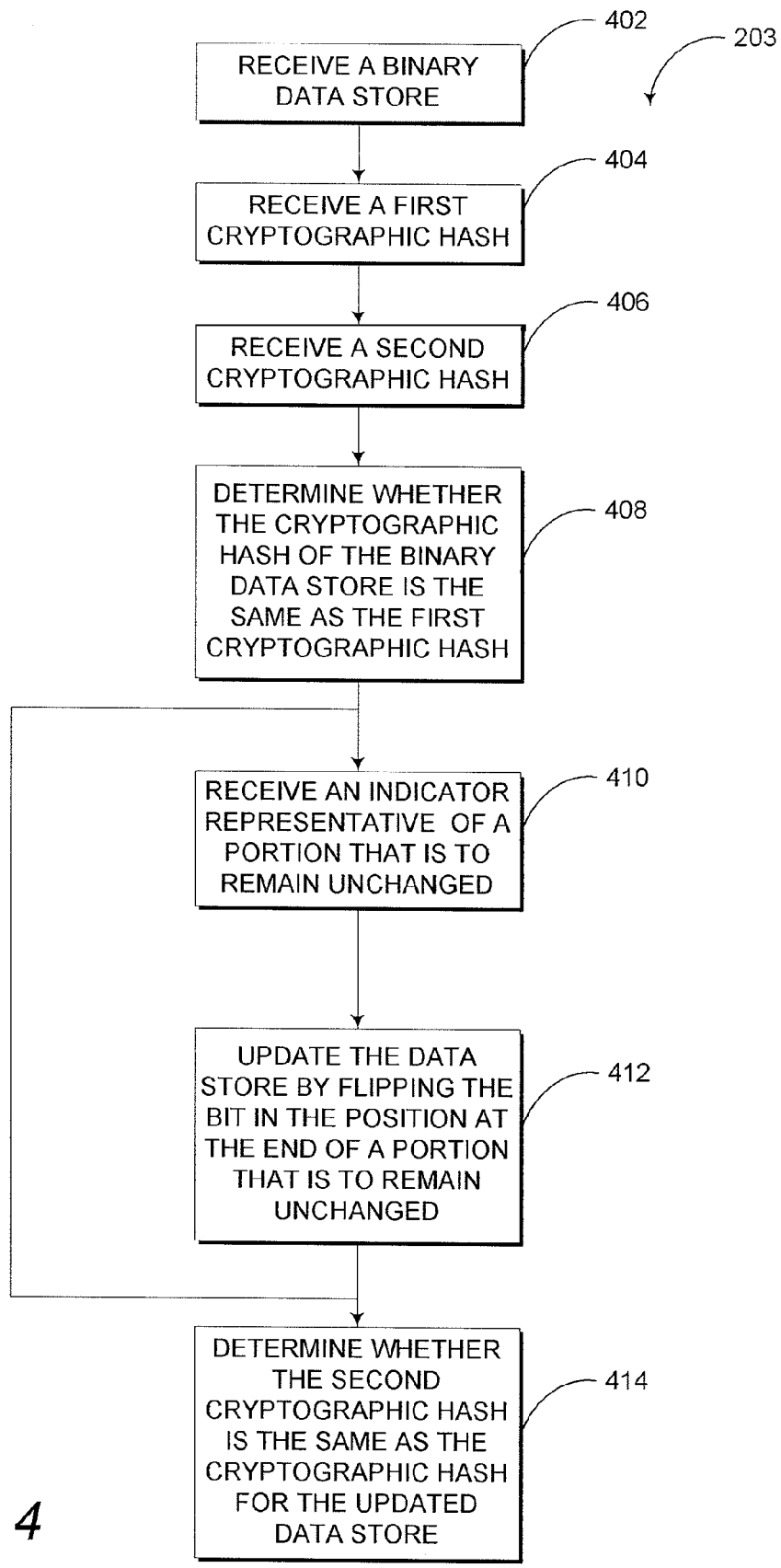
FIG. 4 is a flowchart illustrating one embodiment of a method for using a transaction store to update a data store.

FIG. 4 is a flowchart illustrating the sub-process 203 of FIG. 2 for updating the data store 102B based on the transaction store 112 that indicates the differences between the data store 102A and the data store 103A at the bit level. Beginning at a block 402, the update module 104 receives from the transaction store 112 the binary data store 102B, which is identical to the master data store 102A. The update module 104 accesses the transaction store 112 and begins to read the transaction store 112 and update the initial version of the data store 102B to produce the updated version of the data store 103B.

Moving to a block 404, the update module 104 receives the first cryptographic hash from the transaction store 112, which is indicative of the data store 102A. Continuing to a block 406, the update module 104 receives the second cryptographic hash from the transaction store 112, which corresponds to the data store 103A. At a block 408, the update module 104 generates the cryptographic hash of the data store 102B and determines whether the cryptographic hash received at block 406 is the same as the generated cryptographic hash indicative of the data store 102B. This verifies that the correct data store has been selected for update. Because a cryptographic hash has an improbably low statistical likelihood of not being unique when generated for a particular set of data, the two hashes should only match if the data stores are identical.

The update module 104 processes the remainder of the transaction store 112 as follows. Moving to a block 410, the update module 104 receives from the transaction store 112 an indicator, such as a number, representative of each portion that is to remain unchanged in the binary data store 103B. Continuing to a block 412, the update module 104 updates the binary data store 102B by flipping the bit in the output data store 103B in the position at the end of a portion that is to remain unchanged. In one embodiment, the portion is a sequential portion. Thus, when the data store 103B initially is the same as the data store 103A, the update module 104 skips over the number of bits in the output data store 103B that are to remain unchanged. The update module 104 flips the bit in the data store 103B that occurs after the last bit in the sequence that remains unchanged between the original data store 102A and the updated data store 103A. Because the only options for a bit value are 1 or 0, the update module 104 can simply flip the next bit in the data store 103B (e.g., change the bit value from 0 to 1 or vice versa) to reflect the changed data. The process then continues for each value in the transaction store 112. For example, the update module 104 reads the indicator from the transaction store 112 that is representative of a sequential portion and skips over that number of bits before flipping another bit.

In one embodiment, when two consecutive bits in the data store 103A are altered, a zero is output to the transaction store 112 as the next sequential portion that is to remain unchanged. Zero bits are skipped over in the data store 102B before flipping the bit in the data store 103B. In one embodiment, the sequential portion that remains unchanged is stored as a 16 bit value, e.g., as two bytes. Hence, in such an embodiment, 65,535 is the largest quantity of bits that can be written as an unchanged sequential portion. In one embodiment, 65,535 is a unique number or sentinel value that indicates that the bit following the 65,535 bits is not to be flipped. Instead, the update module 104 skips over the 65,535 bits that are to remain unchanged and then reads the next byte to determine an additional number of bits to skip over before changing the value of a bit. In one embodiment, if the remainder of the data store 103B is unchanged, the number of sequential bits that remain the same will not be outputted to the transaction store 112. This prevents the update module 104 from attempting to flip a non-existent bit beyond the end of the data store 103B.

Proceeding to a block 414, after the data store 103B has been created based on the original data store 102B and the changes indicated by the transaction store 112, the update module 104 creates a cryptographic hash indicative of the data store 103B and compares it to the cryptographic hash representing the data store 103A received at block 406. The hash values should only be identical if the update was done correctly, and the data store 103B is identical to the data store 103A.

Figure 6:
FIG. 6 is a data diagram illustrating one embodiment of a transaction store.
Figure 7:
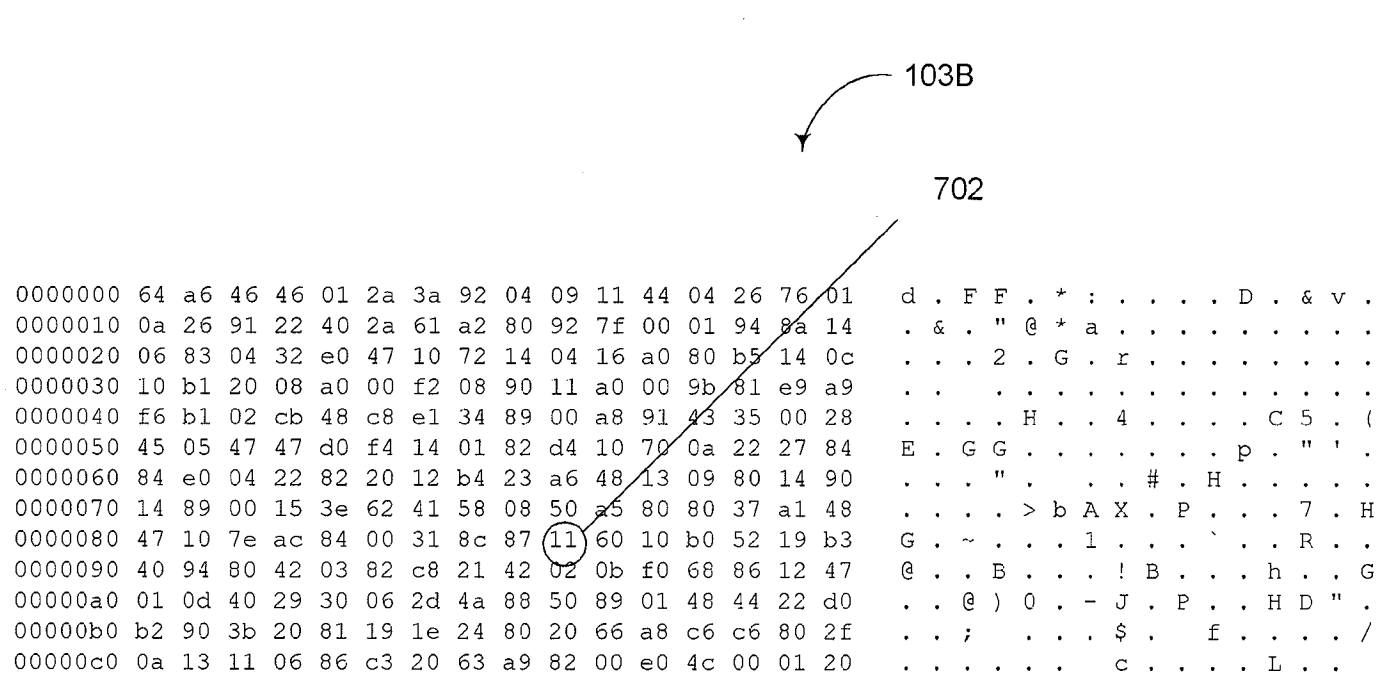

FIGS. 5-7 are data diagrams that illustrate an example of the processes described in FIGS. 3 and 4. FIG. 5 illustrates a hexadecimal representation of the data in the data store 102A. The creation module 101 compares data stores 102A and 103A and finds that bit 502 is the first bit that is different between the data store 102A and the data store 103A.

FIG. 6 is a data diagram illustrating the transaction store 112 created by the creation module 101. Cryptographic hash 604, the single underlined portion of FIG. 6, represents a cryptographic hash indicative of data store 102A, and cryptographic hash 606, the double underlined portion of FIG. 6, represents a cryptographic hash indicative of the data store 103A. The data after the cryptographic hashes 604 and 606 represents sequential portions that are identical in the data stores 102A and 103A. Number 608, the circled portion of FIG. 6, represents the first sequential portion of bits that is unchanged between the two versions. The remainder of the transaction store 112 contains numbers indicative of sequential portions that are identical between data store 102A and data store 103A.

FIG. 7 is a data diagram illustrating the updated data store 103B created by the process 203. Bit 702 is the bit immediately following the sequential portion indicated by number 608 in transaction store 112. Thus, the bit 702 is flipped so that it will be identical to the data in data store 103A.

Figure 8:
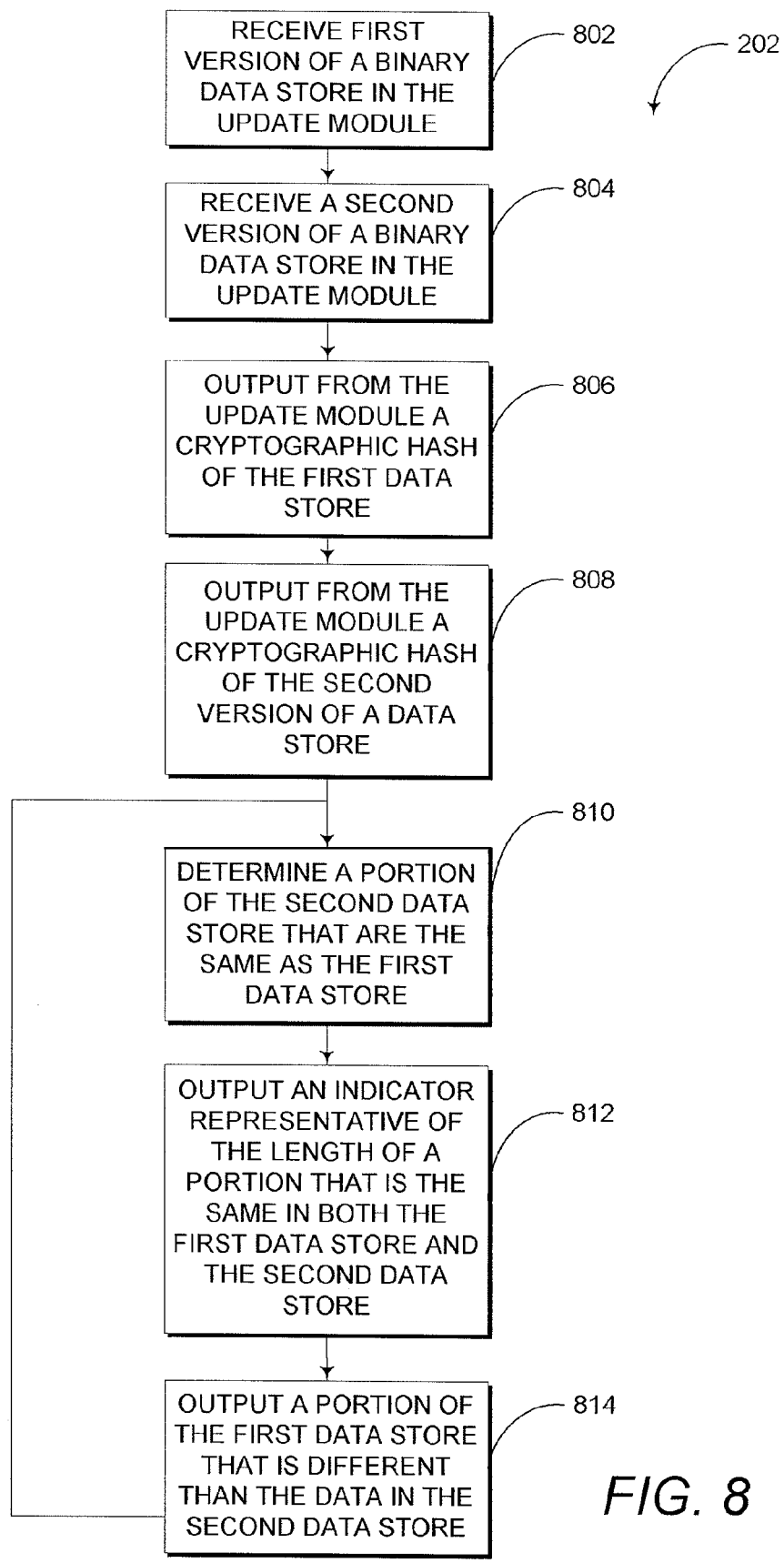
FIG. 8 is a flowchart illustrating one embodiment of a method for creating a transaction store for updating a data store.

FIG. 8 is a flowchart illustrating another embodiment of the sub-process 202 of FIG. 2 for creating the transaction store 112. In particular, FIG. 8 illustrates an embodiment in which the transaction store 112 indicates differences between the data store 102A and 103A at the byte level. An embodiment of sub-process 202 that uses a transaction store that indicates differences at the byte level can be used in applications such as the USPS's NCOALink®. This embodiment typically involves a transaction store that is one tenth the size of a transaction store that indicates differences at the bit level. The process is similar to that depicted in FIG. 3. Accordingly, blocks 802-808 correspond to blocks 301-304 of FIG. 3. Proceeding to a block 810, the creation module 101 determines a portion of the second data store 103A that are the same as the first data store 102A. In one embodiment, the portion is a sequential portion. Continuing to a block 812, the creation module 101 outputs to the transaction store 112 an indicator, such as a number, representative of the length of each sequential portion that is the same in both the first data store 102A and the second the data store 103A. The creation module 101 adds 1 to a counter each time it encounters a byte in the data store 102A that is the same as in the data store 103A. In one embodiment, the embodiments of the subprocess 202 illustrated in FIGS. 3 and 8 may be combined such that part of a transaction store indicates differences at the bit level, and part of a transaction store indicates differences at the byte level. For example, both embodiments of the subprocess 202 may be performed with the output resulting in the smaller transaction store being used.

Moving to a block 814, the creation module 101 outputs a sequential portion of the first data store 102A that is different than the data in the second data store 103A. Thus, when encountering a byte that is different in the data store 102A than in the data store 103A, the creation module 101 outputs the current count, outputs the byte value in the updated data store 103A that is different than the byte in the data store 102A, and resets the counter to zero. In one embodiment, the transaction store 112 contains sets of 32 bits or four bytes. Three bytes, or 24 bits, in the transaction store 112 represent the number of bytes that are the same in both the data store 102A and the data store 103A, and the fourth byte represents the byte that is different in the data store 103A. In one embodiment, similar to the embodiment for indicating differences at the bit level, a zero is output to the transaction file if there is a sequential portion of bytes that is different.

Figure 9:
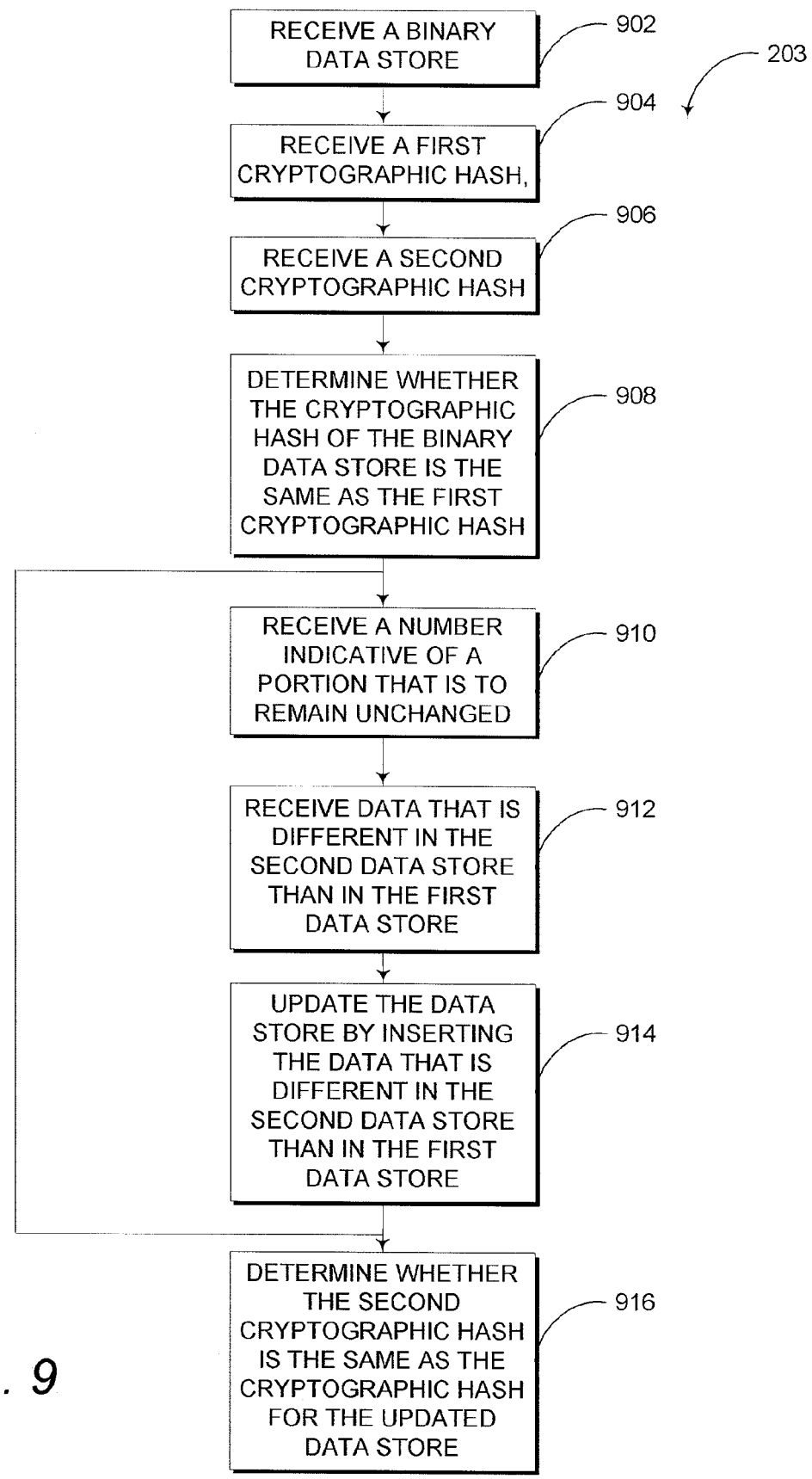
FIG. 9 is a flowchart illustrating one embodiment of a method for using a transaction store to update a data store.

FIG. 9 is a flowchart that illustrates another embodiment of sub-process 203 of FIG. 2 for updating the data store 103B based on the transaction store 112. FIG. 9 is similar to FIG. 4 except that the transaction store 112 in FIG. 9 indicates differences between data store 102A and data store 103A at the byte level rather than at the bit level. At blocks 902, 904, and 906 respectively, the update module 104 receives the data store 102B and the transaction store 112 containing a cryptographic hash indicative of the data store 102A and a cryptographic hash indicative of the data store 103A in the manner described with reference to FIG. 4. Continuing to a block 908, the update module 104 compares the cryptographic hash of 102A to the cryptographic hash of 102B in order to verify that the correct file is being updated.

The steps beginning at a block 910 differ from the embodiment previously discussed. Referring to a block 910, for each sequential, identical portion of bytes, the update module 104 receives from the transaction store 112 an indicator, such as a number, representative of each sequential portion of bytes that is to remain unchanged. Moving to a block 912, the update module 104 receives from the transaction store 112 data that is different in the data store 102A than in the data store 103A. To update the data store 102B, data server 104 skips (if the data store 103B is initially created as a copy of the data store 102B) the number of bytes that are the same in both the data store 102A and 103A. Moving to a block 914, the update module 104 inserts into the data store 103B the byte read from the transaction store 112 and replaces the byte from 102B (and initially the byte in the data store 103B) in the same position. Continuing to a block 916, once the entire transaction store 112 has been processed, the update module 104 generates a cryptographic hash indicative of the data store 103B and compares it to the cryptographic hash received from the transaction store 112 that represents the data store 103A. If the hash values are the same, there is a high statistical likelihood that the update has been performed correctly.

Figure 10:
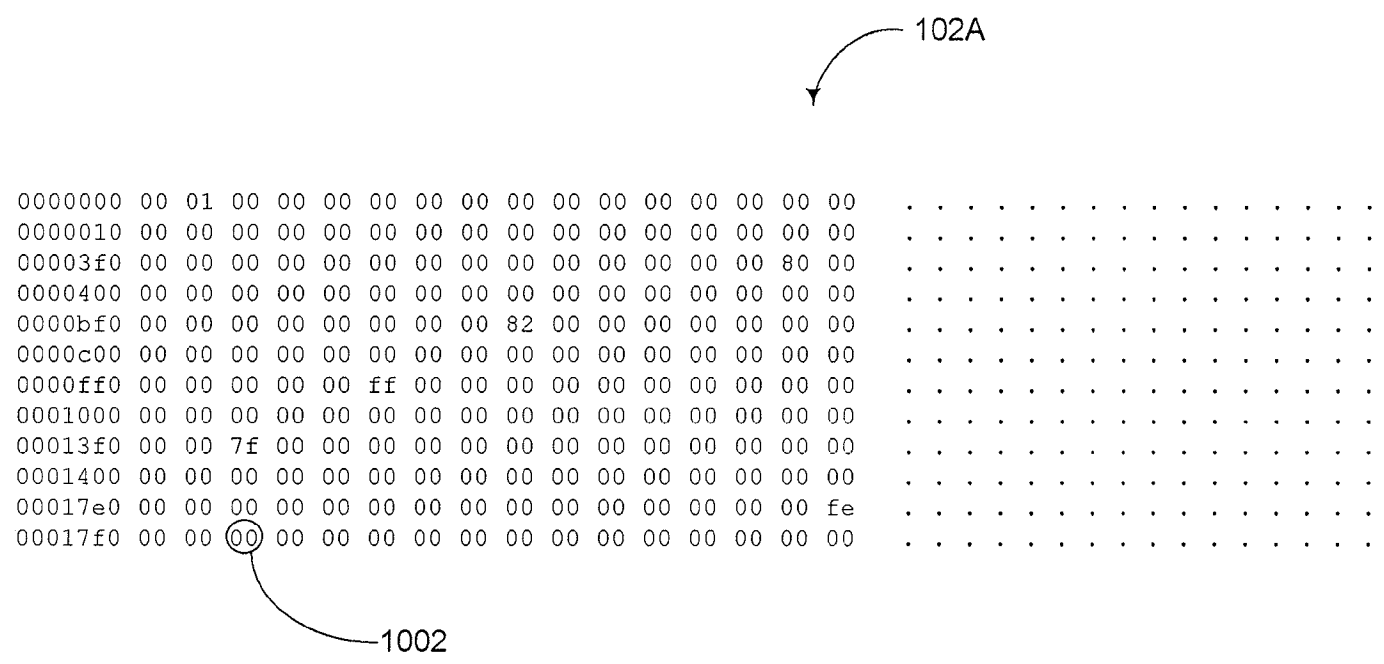
Figure 11:
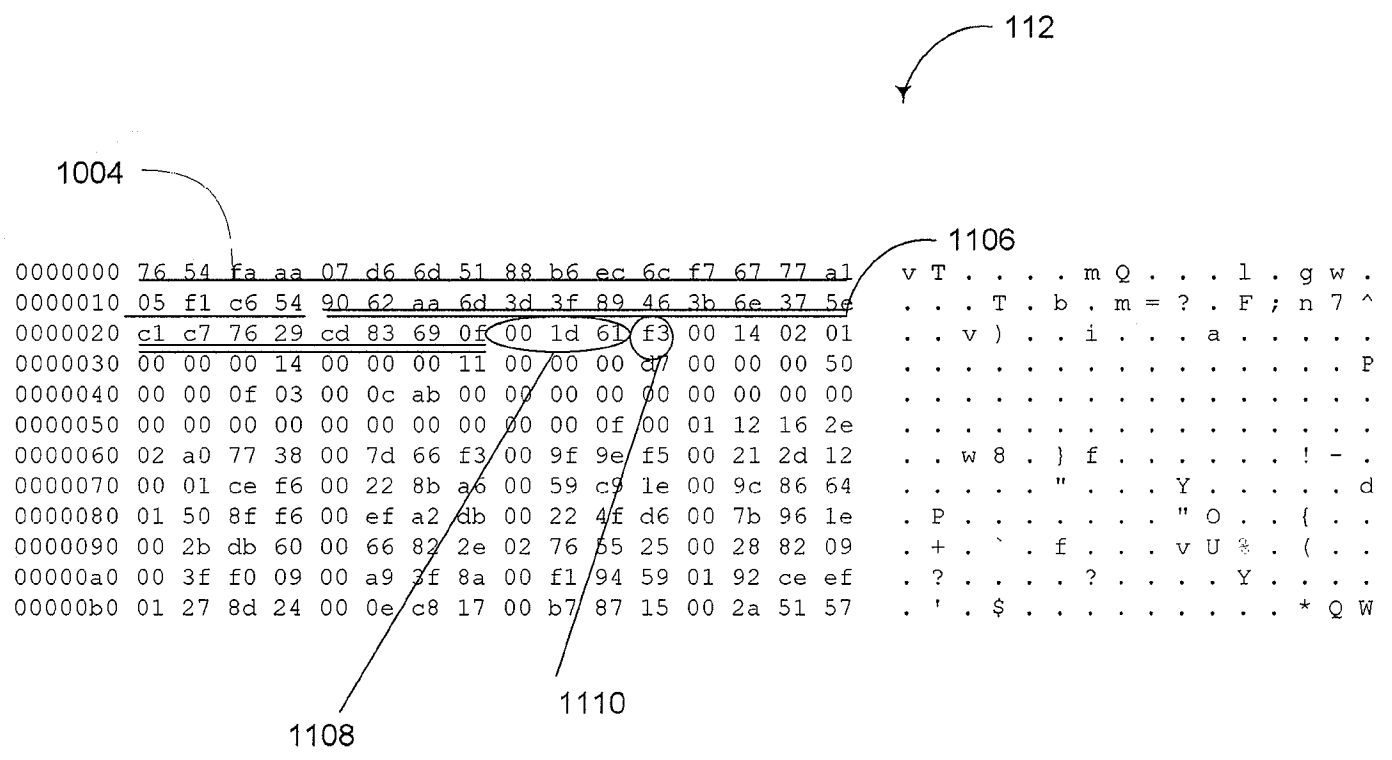
Figure 12:
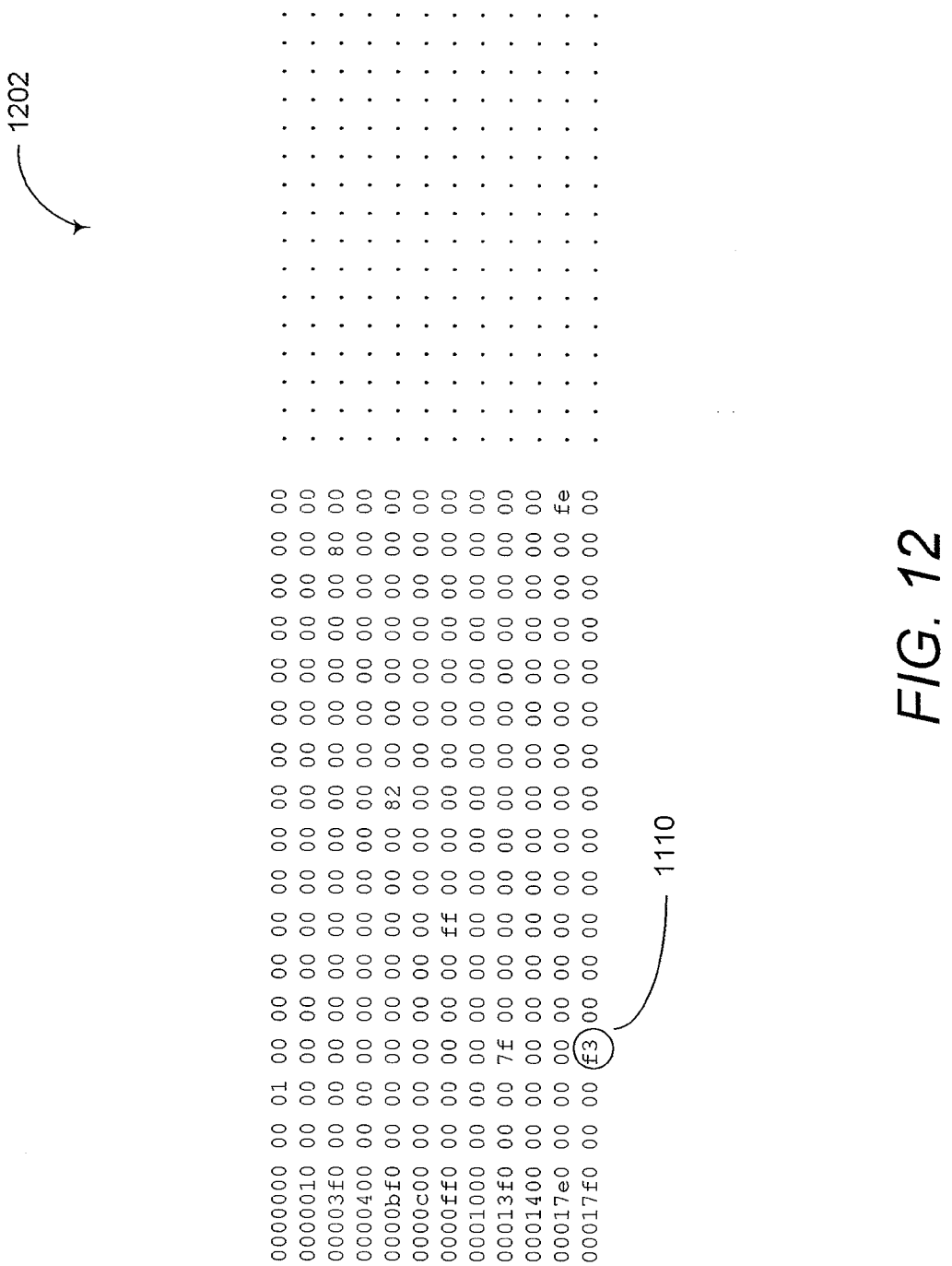
FIG. 12 is a data diagram illustrating one embodiment of an updated version of a data store.

FIGS. 10-12 are data diagrams illustrating an example of the processes described in FIGS. 8 and 9. FIG. 10 is a data diagram illustrating the data store 102A. A byte 1002 is the first byte that is different between the data store 102A and the data store 103A. Thus, the position of the byte 1002 should be indicated in the transaction store 112.

FIG. 11 is a data diagram illustrating the transaction store 112. A cryptographic hash 1104, the single underlined portion of FIG. 11, is a cryptographic hash indicative of the data store 102A, and a cryptographic hash 1106, the double underlined portion of FIG. 11, is a cryptographic hash indicative of the data store 103A. The three bytes 1008, the first circled portion of FIG. 11, represent the number of sequential bytes that were the same in the data stores 102A and 103A. Byte 1110, the second circled portion of FIG. 11, represents the byte in the data store 103A that was different from the byte in the data store 102A. The byte 1110 is in the same position as the byte 1002 in the data store 102A in FIG. 10.

FIG. 12 is a data diagram illustrating the resulting data store 103B. The byte 1110, the byte received from the transaction store 112, is in the position one byte past the position represented by the bytes 1008. The byte 1110 replaces the byte 1002 in the data store 102A in FIG. 10.

In view of the above, one will appreciate that the developed embodiments overcome the problem of efficiently incrementally updating a data store in a distributed data store system. For example, embodiments allow for secure and efficient systems and methods for updating a data store based on the transaction store 112 that represents the differences between two versions of a data store.

Those of skill will recognize that the various illustrative logical blocks and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present development.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. The scope of the development is indicated by the appended claims rather than by the foregoing description. All changes which come within the meaning and range of equivalency of the claims are to be embraced within their scope.

What is claimed is:

1. A method of updating a binary data store based on a transaction store comprising:
   receiving a transaction store from a computer readable memory for describing differences between an initial version of a first binary data store and an updated version of the first binary data store, wherein the transaction store comprises:
      a first cryptographic hash indicative of the complete initial version of the first binary data store;
      a second cryptographic hash indicative of the complete updated version of the first binary data store; and
      an indicator representative of a portion of the data in the initial version of the first binary data store that is to remain unchanged;
   generating a cryptographic hash indicative of a complete second binary data store;
   determining whether the cryptographic hash indicative of the complete second binary data store is the same as the first cryptographic hash;
   if the cryptographic hash indicative of the complete second binary data store is the same as the first cryptographic hash, updating the complete second binary data store by changing the value of a bit in a position of the complete second binary data store that is associated with the portion of data in the initial version of the first binary data store that is to change;
   generating a cryptographic hash indicative of the updated complete second binary data store; and
   validating the updated complete second binary data store by determining whether the second cryptographic hash is the same as the cryptographic hash indicative of the updated complete second binary data store.

2. The method of claim 1, wherein the indicator representative of the portion is zero.

3. The method of claim 1, wherein the cryptographic hash is a SHA-1 hash.

4. The method of claim 1, wherein the indicator is a number.

5. A method of updating a data store based on a transaction store comprising:
   receiving a transaction store from a computer readable memory for describing differences between an initial version of a first binary data store and an updated version of the first binary data store, wherein the transaction store comprises:
      a first cryptographic hash indicative of the complete initial version of the first binary data store;
      a second cryptographic hash indicative of the complete updated version of the first binary data store; and
      an indicator representative of a portion of the data in the initial version of the first binary data store that is to remain unchanged;
      data that is to be updated in the initial version of the first binary data store;
   generating a cryptographic hash indicative of a complete second binary data store;
   determining whether the cryptographic hash indicative of the complete second binary data store is the same as the first cryptographic hash;
   if the cryptographic hash indicative of the complete second binary data store is the same as the first cryptographic hash, updating the complete second binary data store by inserting the data that is to be updated in the initial version of the first binary data store in a location in the second complete binary data store corresponding to the portion of data in the initial version of the first binary data store that is to change;
   generating a cryptographic hash indicative of the updated complete second binary data store; and
   validating the updated complete second binary data store by determining whether the second cryptographic hash is the same as the cryptographic hash indicative of the updated complete second binary data store.

6. The method of claim 5, wherein the indicator representative of the portion is zero.

7. The method of claim 5, wherein the cryptographic hash is a SHA-1 hash.

8. The method of claim 5, wherein the indicator is a number.

9. A system for updating a data store based on a transaction store comprising:
   a storage medium configured to store an initial version of a first binary data store, an updated version of the first binary data store, a second binary data store and a transaction store; and
   at least one processor configured to:
      receive a first cryptographic hash indicative of the complete initial version of the first binary data store;
      receive a second cryptographic hash indicative of the complete updated version of the first binary data store; and
      generate a cryptographic hash indicative of the complete second binary data store;
      determine whether the cryptographic hash indicative of the complete second binary data store is the same as the received first cryptographic hash;
      receive at least one indicator from the transaction store representative of a portion of data in the initial version of the first binary data store that is to remain unchanged;
      if the cryptographic hash indicative of the complete second binary data store is the same as the received first cryptographic hash, update the complete second binary data store based on the received indicator;
      generate a cryptographic hash indicative of the updated complete second binary data store; and
      validate the updated complete second binary data store by determining whether the received second cryptographic hash is the same as the cryptographic hash indicative of the updated complete second binary data store.

10. The system of claim 9, wherein the cryptographic hash is a SHA-1 hash.

11. The system of claim 9, wherein the indicator representative of the portion is zero.

12. The system of claim 9, wherein updating the complete second binary data store based on the received indicator comprises changing the value of a bit in a position associated with the portion of data in the initial version of the first binary data store that is to remain unchanged.

13. The system of claim 9, wherein the indicator is a number.

14. A system for updating a binary data store based on a transaction store comprising:
   a storage medium configured to store an initial version of a first binary data store, an updated version of the first binary data store, a second binary data store and a transaction store; and
   at least one processor configured to:

receive a first cryptographic hash indicative of a complete initial version of the first binary data store from the transaction store;

receive a second cryptographic hash indicative of a complete updated version of the first binary data store from the transaction store;

generate a cryptographic hash indicative of a complete second binary data store;

determine whether the cryptographic hash indicative of the complete second binary data store is the same as the received first cryptographic hash;

receive an indicator from the transaction store representative of a portion of data in the initial version of the first binary data store that is to remain unchanged;

receive, from the transaction store, data that is to be updated in the binary data store;

if the cryptographic hash indicative of the complete second binary data store is the same as the first cryptographic hash, updating the complete second binary data store by inserting the data that is to be updated in the initial version of the first binary data store in a location in the second complete binary data store corresponding to the portion of data in the initial version of the first binary data store that is to change;

generate a cryptographic hash indicative of the updated complete second binary data store; and validate the updated complete binary data store by determining whether the second cryptographic hash is the same as the cryptographic hash indicative of the updated binary data store.

15. The system of claim 14, wherein the cryptographic hash is a SHA-1 hash.

16. The system of claim 14, wherein the indicator representative of the portion is zero.

17. The system of claim 14, wherein the indicator is a number.

18. A system for updating a data store based on a transaction store comprising:

means for storing an initial version of a first binarty data store, an updated version of the first binary data store, a second binary data store and a transaction store; and means for processing data, said processing means configured to:

receive a first cryptographic hash indicative of the complete initial version of the first binary data store;

receive a second cryptographic hash indicative of the complete updated version of the first binary data store; and generate a cryptographic hash indicative of the complete second binary data store;

determine whether the cryptographic hash indicative of the complete second binary data store is the same as the received first cryptographic hash;

receive an indicator from the transaction store representative of a portion of data that is to remain unchanged in the initial version of the first binary data store;

if the cryptographic hash indicative of the complete second binary data store is the same as the received first cryptographic hash, update the complete second binary data store based on the received indicator;

generate a cryptographic hash indicative of the updated complete second binary data store; and validate the updated complete second binary data store by determining whether the received second cryptographic hash is the same as the cryptographic hash indicative of the updated complete second binary data store.

19. A system for updating a data store based on a transaction store comprising:

means for storing an initial version of a first binary data store, an updated version of the first binary data store, a second binary data store and a transaction store; and means for processing data, said processing means configured to:

receive a first cryptographic hash indicative of a complete initial version of the first binary data store;

receive a second cryptographic hash indicative of a complete updated version of the first binary data store;

generate a cryptographic hash indicative of the complete second binary data store;

determine whether the cryptographic hash indicative of the complete second binary data store is the same as the received first cryptographic hash;

receive an indicator from the transaction store representative of a portion of data that is to remain unchanged in the binary data store;

receive from the transaction store data that is to be updated in the first version of the binary data store;

if the cryptographic hash indicative of the complete binary data store is the same as the received first cryptographic hash, update the complete second binary data store by inserting the data that is to be updated in the initial version of the first binary data store in a location in the second complete binary data store corresponding to the portion of data in the initial version of the first binary data store that is to change;

generate a cryptographic hash indicative of the updated complete second binary data store; and validate the updated complete second binary data store by determining whether the received second cryptographic hash is the same as the cryptographic hash indicative of the updated complete second binary data store.

* * * * *

UNITED STATES PATENT AND TRADEMARK OFFICE
CERTIFICATE OF CORRECTION

| | | |
|---|---|---|
| PATENT NO. | : 8,712,964 B2 | Page 1 of 1 |
| APPLICATION NO. | : 12/326796 | |
| DATED | : April 29, 2014 | |
| INVENTOR(S) | : Robert F. Snapp | |

It is certified that error appears in the above-identified patent and that said Letters Patent is hereby corrected as shown below:

On the Title Page

Page 1 (item 73, Assignee) at line 1, Change "Services" to --Service--.

In the Claims

At Column 13, Line 39, change "binarty" to --binary--.

Signed and Sealed this
Seventh Day of October, 2014

Michelle K. Lee
*Deputy Director of the United States Patent and Trademark Office*